United States Patent [19]
Schilke et al.

[11] 3,803,373
[45] Apr. 9, 1974

[54] INJECTION MOLDING MACHINE SWITCH SENSOR RESPONSIVE TO MATERIAL CONTENT LEVEL IN MOLDS

[75] Inventors: Waldemar Schilke, Trenton, Ontario; Ladislav Hujik, Batawa, Ontario, both of Canada

[73] Assignee: Bata Shoe Company Inc., Belcamp, Md.

[22] Filed: May 16, 1972

[21] Appl. No.: 253,894

[30] Foreign Application Priority Data
May 17, 1971  Canada .................................. 113174

[52] U.S. Cl. ............ 200/52 R, 200/61.2, 200/61.42, 200/153 T
[51] Int. Cl. ........................................... H01h 35/00
[58] Field of Search ........ 200/47, 52 R, 61.2, 61.21, 200/61.41, 61.42, 61.43, 61.44, 153 T

[56] References Cited
UNITED STATES PATENTS
3,027,075  3/1962  Howdle et al. .................. 200/61.41
2,573,139  10/1951  Hoffman ......................... 200/61.41
3,348,004  10/1967  Carroll ............................. 200/61.2
3,612,800  10/1971  Slopa .............................. 200/153 T Primary Examiner—J. R. Scott
Attorney, Agent, or Firm—Holman & Stern

[57] ABSTRACT

Shoe soles are molded from thermoplastic material in a plurality of molds mounted on a turntable, which is rotatably mounted on a fixed base. The thermoplastic material is injected into the molds under pressure by an extruder, and the extruder motor is automatically shut-off by a micro-switch resiliently mounted on the base. The switch is actuated by an actuator rod coupled to the piston of the mold for movement therewith as the mold fills. During use, the turntable often tilts and, in order to ensure that the extruder motor is shut-off when the mold has been filled, a cam arrangement is provided in association with the actuator rod and the micro-switch for keeping the distance between the rod and the switch constant immediately preceding molding.

4 Claims, 4 Drawing Figures

INJECTION MOLDING MACHINE SWITCH SENSOR RESPONSIVE TO MATERIAL CONTENT LEVEL IN MOLDS

This invention relates to a switch device and in particular to a device for stopping injection of a thermoplastic material in a machine for molding shoe soles.

An injection molding machine of the type presently being used for forming and bonding shoe soles to uppers includes a turntable rotatably mounted on a fixed base and supporting a plurality of molds. Each mold includes side portions and a piston-operated bottom. A plurality of lasted upper supports, equal in number to the molds, are movably mounted on a column extending upwardly from the center of the turntable for rotation with the turntable.

In order to produce a shoe, a lasted upper, i.e., a last with a shoe upper mounted thereon, is moved downwardly to close a mold cavity formed by the mold side portions and the bottom, and a sole is molded successively onto the mold bottom of each lasted upper at a molding station. Immediately prior to molding, the lasted upper closes the top of the mold, i.e., the mold cavity is formed and the turntable is rotated so that the mold opposes the dispensing head of a horizontal extruder which feeds a charge of thermoplastic material, e.g., polyvinyl chloride, into the mold under pressure. Usually, two extruders are used, with one extruder on each side of the turntable for dispensing two different colored thermoplastic materials into the mold. After dispensing, the turntable is rotated to an unloading station where the mold is opened and the completed shoe, now on the top last, is removed.

In order to ensure that the same predetermined quantity of thermoplastic material is injected into each mold during each dispensing operation, an injection cut-off switch is employed. The injection cut-off switch is normally a micro-switch fixed mounted on the base of the machine for actuation by an adjustment screw on the lower end of a rod extending downwardly from the bottom of each mold. The pressure of the thermoplastic material filling the mold causes the piston to move downwardly against the action of a pneumatic injection cut-off cylinder beneath the mold. Downward movement of the mold is thus accompanied by simultaneous downward movement of the rod carrying the adjustment screw, which closes the micro-switch to shut off an injection motor in the extruder for dispensing the thermoplastic material into the mold.

It has been found that the use of the above described cut-off switch device gives rise to major problems. For example, the turntable is often tilted during loading of the last, i.e., placing an upper on the last, or by the force of the heavy extruder acting against the end of a mold. When the turntable is tilted, the gap between the micro-switch and the adjustment screw is altered. Thus, the micro-switch is not actuated after dispensing of the above-mentioned predetermined quantity of thermoplastic material into the mold, and consequently too much or too little thermoplastic material is dispensed into the mold. The thickness of the soles formed on the lasted upper thus can vary widely, unless the adjustment screw for actuating the micro-switch is adjusted to compensate for mold tilting. In practice, adjustments must be initially made after almost every molding operation, which results in losses in useful machine operating times. However, when mold are changed to form different sole sizes, initial adjusting of the adjustment screw must be effected, and is a delicate operation.

The object of the present invention is to obviate the above-mentioned problems by providing a self-adjusting cut-off switch device for use in an injection molding machine, whereby a constant distance is maintained between the micro-switch for stopping dispensing of thermoplastic material and the switch actuator rod.

Accordingly, the present invention relates to a cut-off switch device for stopping the injection of thermoplastic material in an injection molding machine, which includes an extruder, a base, a turntable rotatably mounted on the base, and molds having a bottom mounted on the turntable, the switch device comprising a micro-switch, means resiliently mounting said micro-switch on the base of the machine, a switch actuator rod extending downwardly from the bottom of the mold and having a free lower end for actuating the micro-switch to stop injection of thermoplastic material into the mold; means for adjusting the length of said actuator rod; and cam means associated with the actuator rod and the micro-switch for maintaining the distance between the actuator rod and the micro-switch constant during a molding operation.

A preferred embodiment of the invention is defined hereinafter with reference to the accompanying drawings, wherein.

Figure 1:
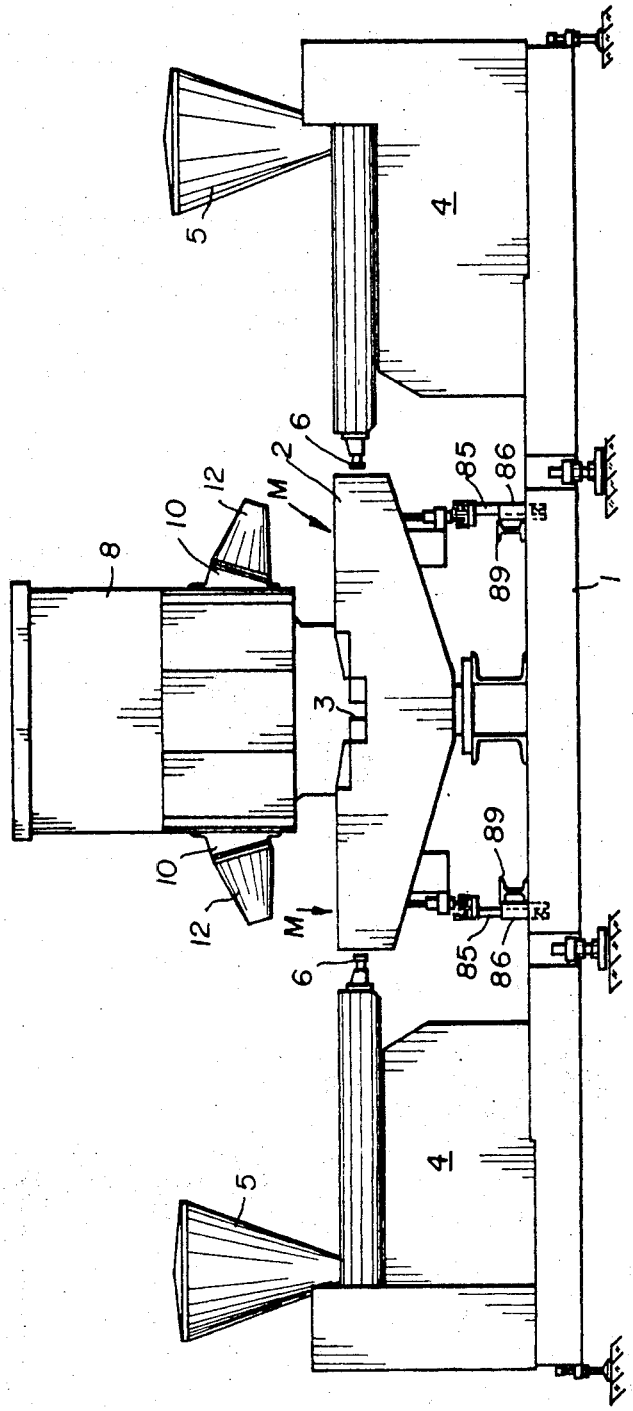
FIG. 1 is a schematic side view of an injection molding machine of the type on which the switch device of the present invention is used.

With reference to FIG. 1, an injection molding machine for manufacturing shoes, i.e., molding a sole onto a lasted upper, includes a supporting base 1, which rests on a floor and rotatably supports a turntable 2. The turntable 2 is generally circular and is provided with four molds 3 for receiving liquid thermoplastic material from extruders 4. Powdered thermoplastic material is fed into a hopper 5 at one end of each of the extruders 4 and emerges in liquid form through a dispensing head 6 into one end of a mold 3.

A central column 8 on the turntable 2 is provided with four last supports 10 (only two shown) located above the turntable 2 at 90° to each other. Each last support 10 supports two lasts, one on each surface 12. The last supports 10 are rotatable and vertically slidable on the column 8, so that the lasts can be sequentially loaded with an upper, rotated into position over a mold, moved downwardly to close the mold, moved upwardly to open the mold and rotated to an unloading position where the finished shoe is removed from the last.

In a two color molding process, molding of two portions of a sole is preformed at two molding stations M on opposite sides of the turntable, and loading and unloading of the lasts occurs at two stations located at 90° from each of the molding stations. However, molding can occur at only one station and, for the sake of simplicity, one molding station of a turntable is described hereinafter with reference to FIGS. 3 and 4.

Figure 2:
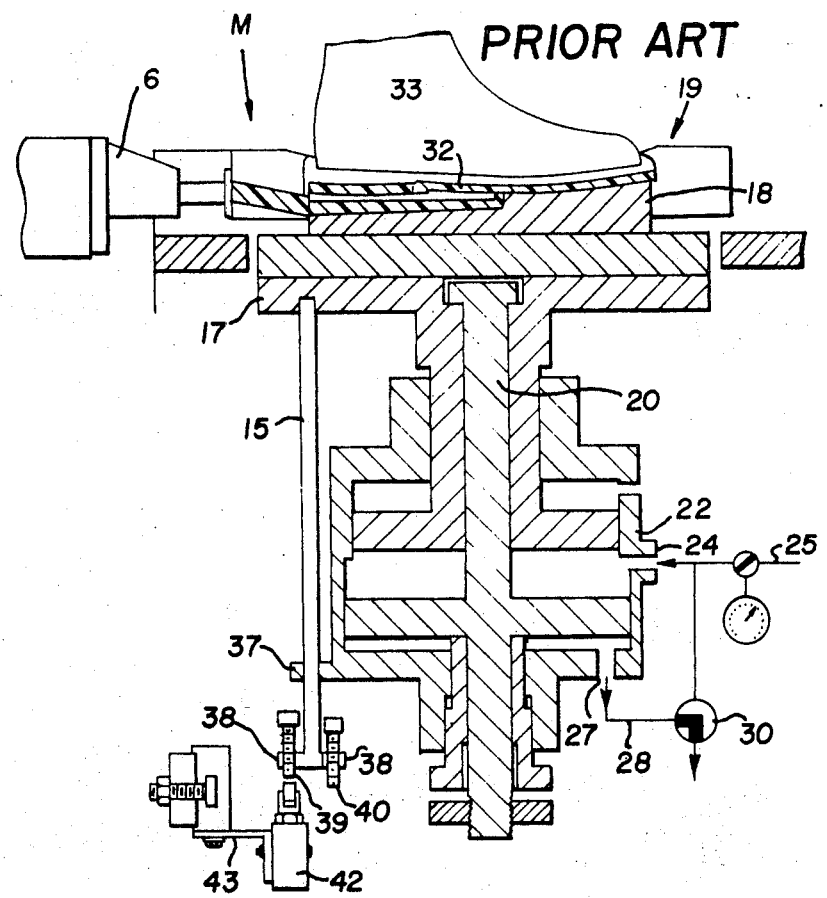
FIG. 2 is a schematic cross-sectional view of a conventional injection cut-off switch presently in use on molding machines.

Referring to FIG. 2, presently available injection cut-off switches are associated with each mold and are located at each molding station M. The cut-off switch device includes a switch actuator rod 15 extending downwardly from plate 17 connected to a bottom 18 of a mold, generally indicated at 19. The bottom 18 of the mold 19 is mounted on the plate 17 connected to the upper end of a piston 20, which extends downwardly into an injection cut-off cylinder 22 suspended from the turntable. The cylinder 22 is connected to a source of pneumatic pressure (not shown) by an inlet duct 24 and line 25, and air is discharged from the cylinder 22 via an outlet duct 27, line 28 and a valve 30. Thus the pressure in the cylinder 22 can be varied depending on the size of the sole 32 to be molded in the mold 3.

In order to mold the sole 32 onto the base of a lasted upper 33, the dispensing head 6 is moved against the outer end of the mold 19, and liquid thermoplastic material is injected into the mold. As the bottom 18 of the mold 19, plate 17 and piston 20 move downwardly, the switch actuator rod 15 also moves downwardly, sliding in a flange 37 on the lower end of the cylinder 22. The bottom end of the rod 15 includes a pair of arms 38, through which extend adjustment screws 39 and 40. At one molding station M, as the rod 15 moves down, one adjustment screw 39 engages a micro-switch 42, and, at the other molding station, the screw 40 engages a second micro-switch (not shown). Closing of the switch 42 shuts off the injection motor (not shown) in the extruder 4 to stop the feeding of thermoplastic material through the head 6. The switch 42 is fixedly mounted on the frame or base 1 of the machine by brackets 43. As mentioned hereinbefore, it is necessary to adjust the screws 39 and 40 frequently in order to compensate for tilting of the turntable 2 and mold changes. Otherwise, variations occur in the thickness of the soles formed in the molds. Such constant adjustment of the screws 39 and 40 is a time consuming and often inaccurate process.

Figure 3:
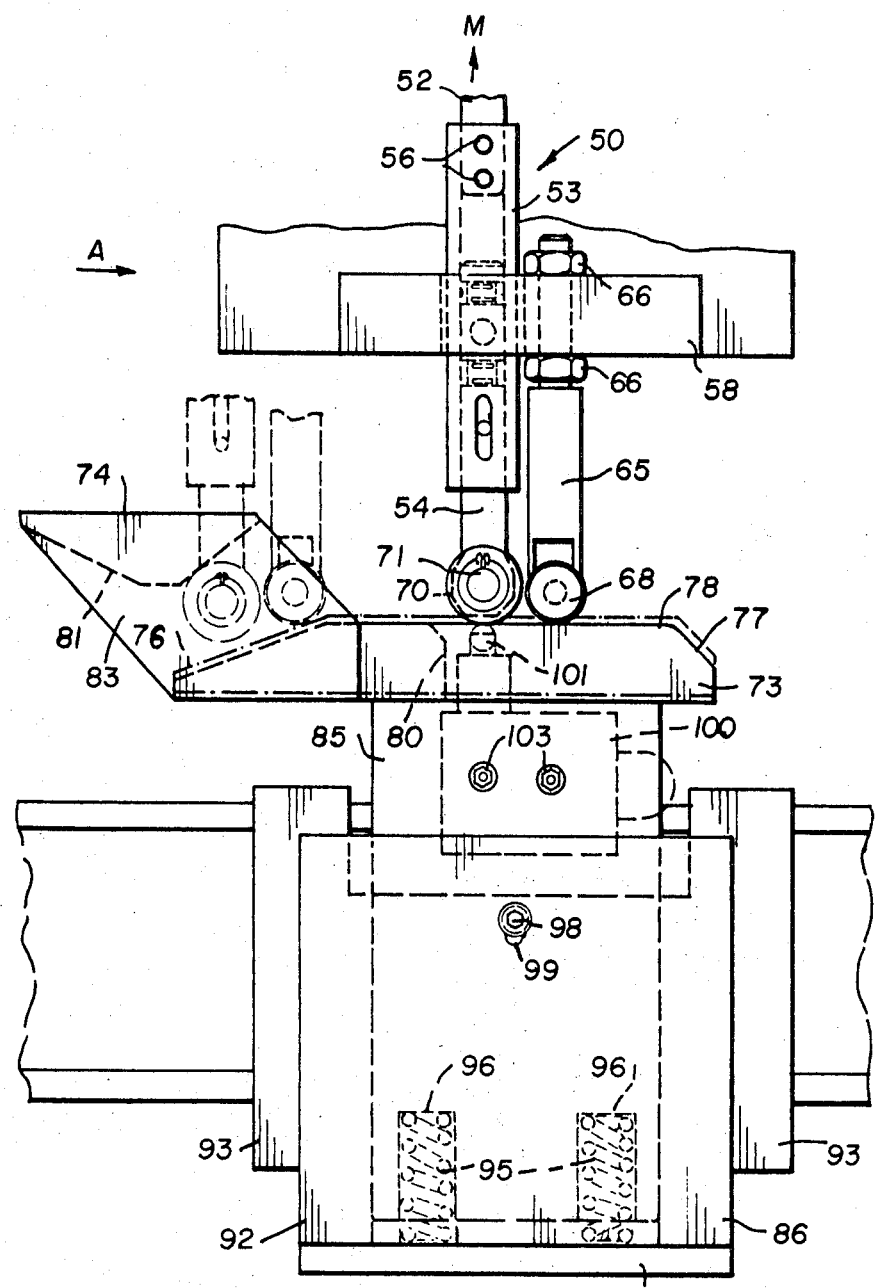
FIG. 3 is an elevation view of the switch device of the present invention.
Figure 4:
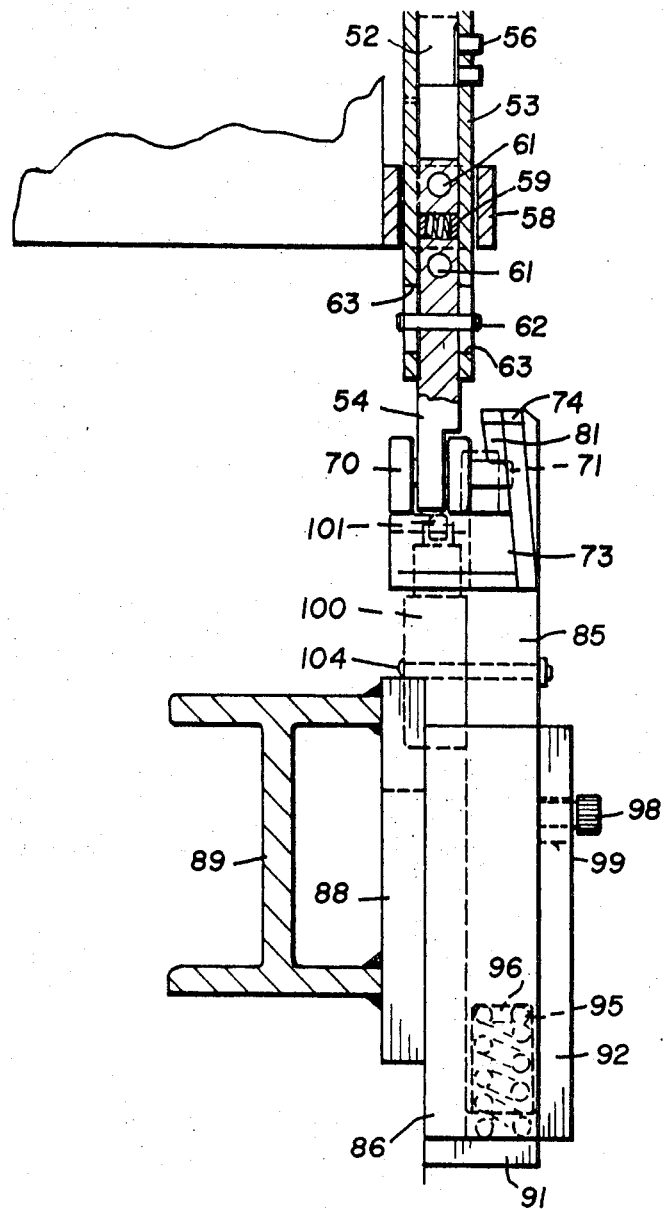
FIG. 4 is a partly sectioned end view of the switch device of FIG. 3.

Referring now to FIGS. 3 and 4, the switch device of the present invention includes a switch actuator rod, generally indicated at 50, which also extends downwardly from a plate on the bottom of a mold. The switch actuator rod 50 is formed of three parts including an upper rod 52, a sleeve 53 and a lower rod 54. The upper rod 52 is connected at its top end to the bottom of the mold, and its bottom end is secured in the sleeve 53 by screws 56. The sleeve 53 extends downwardly through a bracket 58, which forms a part of the turntable structure. For example, the bracket 58 may be provided on the lower outside edge of an injection cut-off cylinder 22 (FIG. 2). The sleeve 53 is vertically movable in the bracket 58.

The upper end of the lower rod 54 is slidably mounted in the sleeve 52 and is provided with friction brakes in the form of radially extending helical springs 59 loosely mounted in bores closed by metal or plastic plugs 61. A pin 62 extends through the lower rod 54 into opposed elongated slots 63 in the sleeve 53 near the bottom end thereof for maintaining the rod 54 in the sleeve 53 and limiting vertical movement of the rod. Thus, the lower rod 54 can be moved up or down if sufficient force is applied to its free bottom end, but once moved the rod 54 is held in position by the friction brakes. The bracket 58 also supports the threaded upper end of a cam follower rod 65, which is secured to the bracket 58 by nuts 66 and is provided with a roller 68 at its bottom end.

The bottom end of the rod 54 is provided with rollers 70 on an axle 71, the outer end of which extends beyond the side of the outer roller for engaging a cam member. The cam member includes lower and upper cam tracks 73 and 74, respectively. The lower cam track 73 has inclined leading and trailing ends 76 and 77, respectively, and a horizontal central portion 78. The horizontal portion 78 of the lower cam track 73 is wider at its leading end than at its trailing end, the width of the track being reduced at a point 80 following the leading end 76 of the track. The upper cam track 74 is in the form of a generally V-shaped flange 81 located above the inclined leading edge 76 of the lower track 73. The upper track 74 is connected to the lower track 73 by an arm 83.

The lower cam track 73 is securely mounted on or integral with the top end of a carriage 85, which is vertically slidable in a bracket 86. The bracket 86 includes an inner plate 88 for rigidly mounting the bracket on an I-beam 89 of the molding machine base 1 (FIG. 1), bottom plate 91, an outer plate 92, and side plates 93. Helical springs 95 are provided in cavities 96 in the bottom end of the carriage 85. The springs 95 bear against the bottom plate 91 to bias the carriage 85 and consequently the lower cam track 73 upwardly. A screw 98 in the front of the carriage 85 extends through a longitudinally extending slot 99 in the outer plate 92 of the bracket 86 to limit the vertical movement of the carriage 85.

A micro-switch 100, with a vertically movable plunger 101 for closing the switch, is securely mounted on the inner surface of the carriage 85 adjacent the upper end thereof by nuts 103 and bolts 104. The micro-switch 100 is connected to the injection motor of an exruder 4 (FIG. 1) for shutting-off the injection motor when the plunger 101 is depressed.

During operation, with the turntable 2 rotating in the direction of arrow A (FIG. 3) and a mold 3 approaching a molding station M, the roller 68 of the cam follower rod 65 and the axle 71 of the rollers 70 on the switch actuator rod 50 pass beneath the flange 81 of the upper cam track 74. When the axle 71 of the rollers 70 engages the flange 81, the lower rod 54 is moved downwardly to its lowermost position, as shown in phantom outline in FIG. 3 for engagement with the lower cam track 73. The rollers 68 and 71 ride up the inclined leading end 76 of the lower cam track 73 and onto the horizontal portion 78, whereby the carriage 85 is caused to move downwardly into the bracket 86 and the lower rod 54 moves upwardly into the sleeve 53. The lower cam track 77 moves downwardly (from the position shown in phantom outline to that shown in solid lines in FIG. 3) against the springs 95, and is held down by the follower roller 68 and rod 65, which are rigidly connected to the turntable 2. The lower rod 54 moves upwardly into the sleeve 53, and is held in its raised position by the friction brakes in the rod.

Thus, the actuator rod 50 and the micro-switch 100 are moved upwardly and downwardly, respectively. However, the distance between the plunger 101 of the micro-switch 100 and the lower free end of the actuator rod 50 is maintained constant. As the rollers 70 of the actuator rod 50 move past the point 80, only the roller 68 of the cam follower rod 65 engages the horizontal portion 78 of the lower cam track 73. Thus, the actuator rod 50 is free to move downwardly with the bottom of the mold 3 during injection of thermoplastic material into the mold to close the switch 100 and shut-off the injection motor of the extruder 4.

If, when the dispensing head 6 is brought against the end of the mold 3, the turntable 2 is caused to tilt so that the actuator rod 50 and cam follower rod 65 move upwardly, the spring loaded carriage 85 also moves upwardly. In any event, the distance between the free end of the actuator rod 50 and the plunger 101 of the micro-switch 100 is maintained constant immediately preceding a molding operation. The friction brakes in the lower rod 54 make the actuator rod 50, as a whole, sufficiently rigid to close the switch 100, without movement of the lower rod 54 into the sleeve 53, but permit variations in the length of the actuator rod 50 when the axle 71 or rollers 70 are engaged by the cam tracks 73 and 74.

Thus, a switch device has been described for automatically shutting-off the injection motor of an extruder after a predetermined quantity of thermoplastic material has been injected into a mold. It will be appreciated that the switch device can be used with any number of molds on a single machine, and that the material injected into the mold by the extruder need not be a thermoplastic material. For example, the switch device could be used on a machine for molding hardenable liquid rubber or other plastic materials.

What is claimed is:

1. In an injection molding machine wherein a turntable is rotatably mounted on a supporting base, molds having a movable bottom are mounted on the turntable and an extruder is provided for injecting moldable material into each mold at a molding station, a switch device in combination with said machine for controlling the injection of said moldable material into a mold, said switch device comprising a switch electrically connected to said extruder for stopping injection of said moldable material into said mold; means resiliently mounting said switch on the supporting base of the molding machine at a molding station; a switch actuator rod connected to the bottom of each said mold and movable with said mold bottom for actuating said switch to stop injection of said moldable material into said mold; means for varying the length of said actuator rod; and cam means associated with said actuator rod and said switch at the molding station for maintaining the distance between said actuator rod and said switch constant preceding a molding operation, and permitting movement of the actuator rod against said switch when the bottom of the mold moves downwardly during molding to stop the injection of moldable material into the mold after a predetermined quantity of said moldable material has entered the mold.

2. A switch device according to claim 1, wherein said means resiliently mounting said switch on the supporting base of the machine includes a bracket on said supporting base, a carriage slidably mounted in said bracket, and means resiliently connecting said carriage to said bracket.

3. A switch device according to claim 1, wherein said actuator rod includes an upper rod rigidly connected at one end to said mold bottom, a sleeve rigidly having one end connected to the other end of said upper rod; a lower rod slidably mounted in the other end of said sleeve; and friction brake means in said lower rod permitting movement of said lower rod in said sleeve only when the lower rod is subjected to a relatively large force.

4. A switch device according to claim 1, further including at least one roller on the actuator rod for engaging said cam means, a cam follower rod rigidly connected to said turntable; and a roller on said follower rod for engaging the cam means, said cam means including upper and lower cam tracks for varying the length of said actuator rod and moving said switch toward or away from said rod.

* * * * *